US010464302B2

(12) United States Patent
Cheng et al.

(10) Patent No.: US 10,464,302 B2
(45) Date of Patent: Nov. 5, 2019

(54) DIRECT DYEING COLOR FUSED DEPOSITION MODELING THREE-DIMENSIONAL PRINTING APPARATUS AND DIRECT DYEING COLOR FUSED DEPOSITION MODELING THREE-DIMENSIONAL PRINTING METHOD

(71) Applicant: National Taiwan University of Science and Technology, Taipei (TW)

(72) Inventors: Yih-Lin Cheng, Taipei (TW); Freeman Chen, Taipei (TW); Jun-Hao Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 328 days.

(21) Appl. No.: 15/233,813

(22) Filed: Aug. 10, 2016

(65) Prior Publication Data

US 2017/0190115 A1  Jul. 6, 2017

(30) Foreign Application Priority Data

Dec. 30, 2015 (TW) .............................. 104144397 A

(51) Int. Cl.
| | | |
|---|---|---|
| *B33Y 30/00* | (2015.01) | |
| *B29C 64/10* | (2017.01) | |
| *B29C 64/00* | (2017.01) | |
| *B29C 71/00* | (2006.01) | |
| *B05D 3/04* | (2006.01) | |
| *B41J 11/00* | (2006.01) | |
| *B41J 3/407* | (2006.01) | |
| *B33Y 10/00* | (2015.01) | |
| *B29C 64/118* | (2017.01) | |
| *B29K 67/00* | (2006.01) | |
| *B29K 105/00* | (2006.01) | |

(52) U.S. Cl.
CPC ............ *B33Y 30/00* (2014.12); *B05D 3/0486* (2013.01); *B05D 3/0493* (2013.01); *B29C 64/00* (2017.08); *B29C 64/10* (2017.08); *B29C 64/118* (2017.08); *B29C 71/00* (2013.01); *B33Y 10/00* (2014.12); *B41J 3/4073* (2013.01); *B41J 11/0015* (2013.01); *B29K 2067/046* (2013.01); *B29K 2105/0032* (2013.01); *B29K 2995/0021* (2013.01)

(58) Field of Classification Search
CPC .... B05D 3/0486; B05D 3/0493; B41J 3/4073; B41J 11/0015; B33Y 10/00; B29C 64/00; B29C 64/10; B29C 64/118; B29C 71/00; B29C 2071/0018
USPC ........................................................ 264/308
See application file for complete search history.

(56) References Cited

U.S. PATENT DOCUMENTS

2013/0328228 A1   12/2013  Pettis et al.

FOREIGN PATENT DOCUMENTS

| CN | 103180125 | | 6/2013 |
|---|---|---|---|
| CN | 203282709 | | 11/2013 |
| CN | 103517797 | | 1/2014 |
| CN | 104260341 | | 1/2015 |
| CN | 104260341 A | * | 1/2015 |
| CN | 204505848 | | 7/2015 |
| CN | 204723453 | | 10/2015 |
| TW | 577795 | | 3/2004 |
| TW | I424917 | | 2/2014 |
| TW | M481136 | | 7/2014 |
| TW | M513121 | | 12/2015 |
| TW | M513121 U | * | 12/2015 |

OTHER PUBLICATIONS

"Office Action of Taiwan Counterpart Application", dated Mar. 2, 2017, p. 1-p. 5, in which the listed references were cited.
"Office Action of Taiwan Counterpart Application", dated Feb. 27, 2018, p. 1-p. 11.
"Office Action of Taiwan Counterpart Application," dated Nov. 23, 2017, p. 1-p. 4, in which the listed reference was cited.

* cited by examiner

*Primary Examiner* — William P Fletcher, III
(74) *Attorney, Agent, or Firm* — J.C. Patents

(57) ABSTRACT

A direct dyeing type color fused deposition modeling three-dimensional printing apparatus includes a forming stage, a forming unit, and a color-inkjet unit. The forming unit is located above the forming stage for providing forming-material layers on the forming stage in sequence. The color-inkjet unit is located above the forming stage for providing color-ink layers on the forming-material layers in sequence, wherein the forming-material layers and the color-ink layers are stacked alternately in sequence to form a colored three-dimensional object. A direct dyeing type color fused deposition modeling three-dimensional printing method is also provided.

6 Claims, 4 Drawing Sheets

DIRECT DYEING COLOR FUSED DEPOSITION MODELING THREE-DIMENSIONAL PRINTING APPARATUS AND DIRECT DYEING COLOR FUSED DEPOSITION MODELING THREE-DIMENSIONAL PRINTING METHOD

CROSS-REFERENCE TO RELATED APPLICATION

This application claims the priority benefit of Taiwan application serial no. 104144397, filed on Dec. 30, 2015. The entirety of the above-mentioned patent application is hereby incorporated by reference herein and made a part of this specification.

BACKGROUND OF THE INVENTION

Field of the Invention

The invention relates to a three-dimensional printing apparatus and a three-dimensional printing method and particularly relates to a direct dyeing type color fused deposition modeling three-dimensional printing apparatus and a direct dyeing type color fused deposition modeling three-dimensional printing method.

Description of Related Art

With the progress in computer-aided manufacturing (CAM), manufacturers have developed the technology of three-dimensional (3D) printing for rapidly producing a three-dimensional model constructed by software of computer-aided design (CAD) or the like. To be more specific, the three-dimensional printing technology may utilize an additive manufacturing technology (e.g. layer-by-layer model construction) to build three-dimensional (3D) physical models, and the basic principle of the additive manufacturing technology is to manufacture a three-dimensional object by stacking layers, that is, form cross-sectional shapes of a workpiece in the X-Y plane through scanning, shift intermittently at a layer thickness in the Z coordinates, and ultimately form the three-dimensional object.

Take fused deposition modeling (FDM) as an example, it turns a forming material into wires and then heats and melts the forming material, so as to stack the material layer by layer on a forming stage according to the desired shape/contour to form a three-dimensional object. Therefore, in the conventional color fused deposition modeling three-dimensional printing method, the exterior is usually colored after the three-dimensional object is completed, or the three-dimensional object is manufactured by using a colored forming material. In the former case, however, the color ink is only applied to the outer surface of the three-dimensional object, which may be slightly inferior in color properties (hue, value, and chroma) and variability. In the latter case, single-color wire materials are usually used to form a colored object. Thus, the color properties and variability may be inferior and it will be more difficult to form multiple colors (for example, it will be required to repeatedly switch to wire materials of different colors in order to achieve the effect of multiple colors). As a result, the efficiency of manufacturing a colored three-dimensional object is low.

SUMMARY OF THE INVENTION

The invention provides a direct dyeing type color fused deposition modeling three-dimensional printing apparatus and a direct dyeing type color fused deposition modeling three-dimensional printing method for improving the efficiency of manufacturing a colored three-dimensional object as well as increasing color properties and variability of the colored three-dimensional object.

The direct dyeing type color fused deposition modeling three-dimensional printing apparatus of the invention includes a forming stage, a forming unit, and a color-inkjet unit. The forming unit is located above the forming stage to provide a plurality of forming-material layers on the forming stage in sequence. The color-inkjet unit is located above the forming stage to provide a plurality of color-ink layers on the forming-material layers in sequence. The forming-material layers and the color-ink layers are stacked alternately in sequence to form a colored three-dimensional object.

The direct dyeing type color fused deposition modeling three-dimensional printing method of the invention includes the following steps. A forming-material layer is formed on a forming stage. A color-ink layer is formed on the forming-material layer. Another forming-material layer is formed on the forming-material layer, on which the color-ink layer has been formed. Another color-ink layer is formed on the forming-material layer. The forming-material layers and the color-ink layers are stacked alternately in sequence to form a colored three-dimensional object.

Based on the above, the direct dyeing type color fused deposition modeling three-dimensional printing apparatus and the direct dyeing type color fused deposition modeling three-dimensional printing method of the invention utilize the forming unit to form the forming-material layers on the forming stage by fused deposition modeling (FDM), then use the color-inkjet unit to directly dye the forming-material layers to form the color-ink layers, and repeat the steps to alternately stack the forming-material layers and the color-ink layers in sequence, so as to form the colored three-dimensional object. Thus, the structure of each layer of the colored three-dimensional object has a colored appearance and the manufacturing steps are relatively simple. Accordingly, the direct dyeing type color fused deposition modeling three-dimensional printing apparatus and the direct dyeing type color fused deposition modeling three-dimensional printing method of the invention improve the efficiency of manufacturing the colored three-dimensional object as well as enhance the color properties and variability of the colored three-dimensional object.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
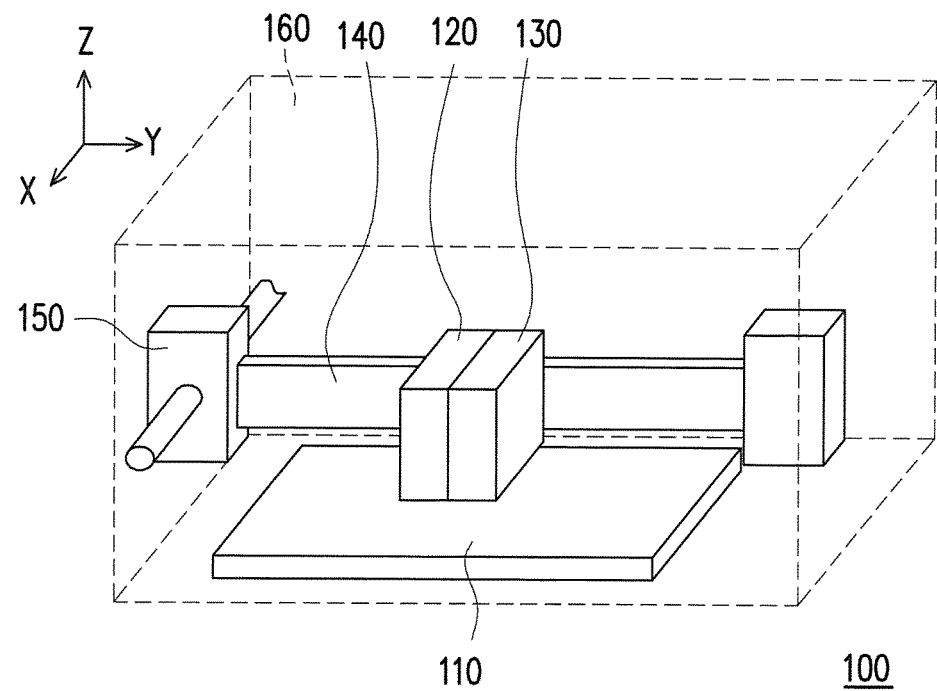
FIG. 1 is a schematic view of a direct dyeing type color fused deposition modeling three-dimensional printing apparatus according to an embodiment of the invention.
Figure 6:
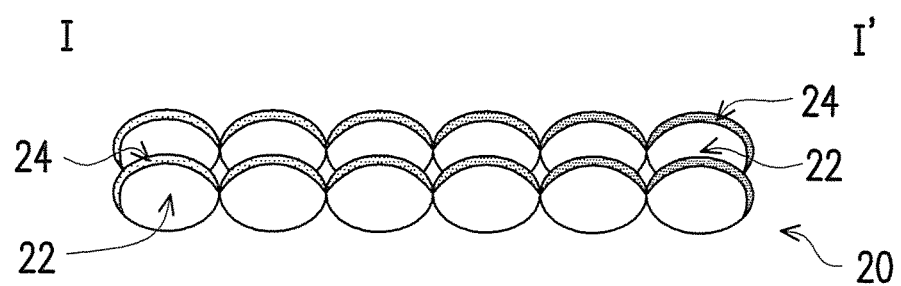
FIG. 6 and FIG. 7 are schematic cross-sectional views of the colored three-dimensional object of FIG. 5 along the line I-I'.
Figure 7:
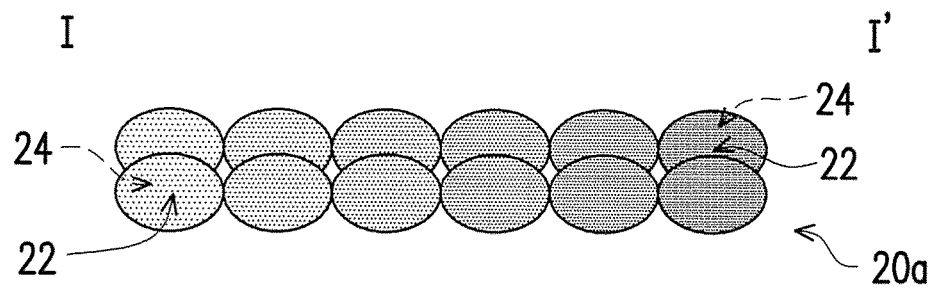

FIG. 1 is a schematic view of a direct dyeing type color fused deposition modeling three-dimensional printing apparatus according to an embodiment of the invention. Referring to FIG. 1, in this embodiment, the direct dyeing type color fused deposition modeling three-dimensional printing apparatus 100 is adapted to form two-dimensional object units layer by layer by fused deposition modeling (FDM) according to a plurality of layered contours of a three-dimensional model and directly dye the two-dimensional object units, so as to stack the dyed two-dimensional object units to form a colored three-dimensional object. Accordingly, the direct dyeing type color fused deposition modeling three-dimensional printing apparatus 100 includes a forming stage 110, a forming unit 120 and a color-inkjet unit 130 located above the forming stage 110, wherein the forming unit 120 is configured to provide a plurality of forming-material layers 22 (i.e. the aforementioned two-dimensional object units) on the forming stage 110 in sequence by fused deposition modeling (FDM), and the color-inkjet unit 130 is configured to provide a plurality of color-ink layers 24 on the forming-material layers 22 (i.e. directly dye the two-dimensional object units) in sequence. The foregoing steps are illustrated by FIG. 2 to FIG. 5, which will be described in detail later. The forming-material layers 22 and the color-ink layers 24 are stacked alternately in sequence to form three-dimensional objects 20 and 20a (as illustrated by FIG. 6 and FIG. 7 which will be described in detail later).

Specifically, referring to FIG. 1, in this embodiment, the direct dyeing type color fused deposition modeling three-dimensional printing apparatus 100 further includes a moving unit 140 and a moving unit 150. The moving unit 140 is connected to the forming unit 120 and the color-inkjet unit 130 to control the forming unit 120 and the color-inkjet unit 130 to move relative to the forming stage 110 in an axial direction X. Similarly, the moving unit 150 is connected to the moving unit 140 for controlling the forming unit 120 and the color-inkjet unit 130 to move relative to the forming stage 110 in an axial direction Y through the moving unit 140. Thus, the moving unit 140 and the moving unit 150 are capable of controlling the forming unit 120 and the color-inkjet unit 130 to form the forming-material layer 22 having a predetermined shape and the color-ink layer 24 corresponding to the forming-material layer 22 on the forming stage 110 (located on an XY plane). Likewise, the direct dyeing type color fused deposition modeling three-dimensional printing apparatus 100 further includes a moving unit (not shown), which is connected to the aforementioned moving units or the forming unit 120 and the color-inkjet unit 130 for controlling the forming unit 120 and the color-inkjet unit 130 to move relative to the forming stage 110 in an axial direction Z, so as to stack a plurality of the forming-material layers 22 and a plurality of the color-ink layers 24 in sequence along the axial direction Z to form the colored three-dimensional objects 20 and 20a (as shown in FIG. 6 and FIG. 7). In addition, the moving unit may be connected to the forming stage 110 to move the forming stage 110 relative to the forming unit 120 and the color-inkjet unit 130, so as to achieve the forming effect described above. Although FIG. 1 illustrates a case where the forming unit 120 and the color-inkjet unit 130 are disposed together, in other embodiments of the invention, the forming unit 120 and the color-inkjet unit 130 may be disposed independently to be controlled by different moving units respectively. Nevertheless, the invention is not limited to the above embodiments.

Furthermore, in this embodiment, the direct dyeing type color fused deposition modeling three-dimensional printing apparatus 100 further includes a thermostat chamber 160. The forming stage 110, the forming unit 120, and the color-inkjet unit 130 are disposed in the thermostat chamber 160 for forming the colored three-dimensional objects 20 and 20a in the thermostat chamber 160. The thermostat chamber 160 may be a hot air circulation system or other suitable temperature control systems, for example. Accordingly, the thermostat chamber 160 may be used to control a constant temperature environment that is required for the direct dyeing type color fused deposition modeling three-dimensional printing apparatus 100 to form the colored three-dimensional objects 20 and 20a, such that the forming unit 120 and the color-inkjet unit 130 form the colored three-dimensional objects 20 and 20a in the predetermined constant temperature environment.

FIG. 2 to FIG. 5 are schematic views showing a direct dyeing type color fused deposition modeling three-dimensional printing method according to an embodiment of the invention. FIG. 6 and FIG. 7 are schematic cross-sectional views of the colored three-dimensional object of FIG. 5 along the line I-I'. Steps of the direct dyeing type color fused deposition modeling three-dimensional printing method are described in detail hereinafter with reference to FIG. 1 and FIG. 2 to FIG. 7.

Figure 2:
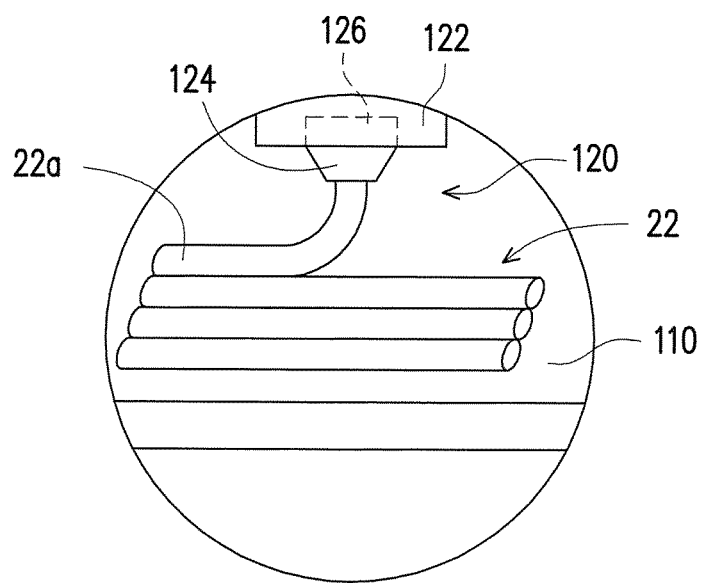
FIG. 2 to FIG. 5 are schematic views showing a direct dyeing type color fused deposition modeling three-dimensional printing method according to an embodiment of the invention.

First, referring to FIG. 1 and FIG. 2, in this embodiment, the direct dyeing type color fused deposition modeling three-dimensional printing method includes a step of forming the forming-material layer 22 on the forming stage 110. Specifically, the direct dyeing type color fused deposition modeling three-dimensional printing apparatus 100 forms the forming-material layer 22 on the forming stage 110 by fused deposition modeling (FDM) by the forming unit 120. Therefore, the forming unit 120 may include a supply cartridge 122, a printing head 124, and a heater 126, wherein the supply cartridge 122 is configured to store a thermofusible forming material 22a (e.g. a transparent wire material) and communicate with the printing head 124 to supply the forming material 22a to the printing head 124. Then, the forming material 22a is heated and melted by the heater 126 connected to the printing head 124 and deposited on the forming stage 110 in the heated and melted state according to a desired shape/contour, so as to form the forming-material layer 22 (the forming-material layer 22 is heated and melted on the forming stage 110). Nevertheless, it should be noted that the invention is not intended to limit the structure of the forming unit 120, which may be adjusted as required.

Figure 3:
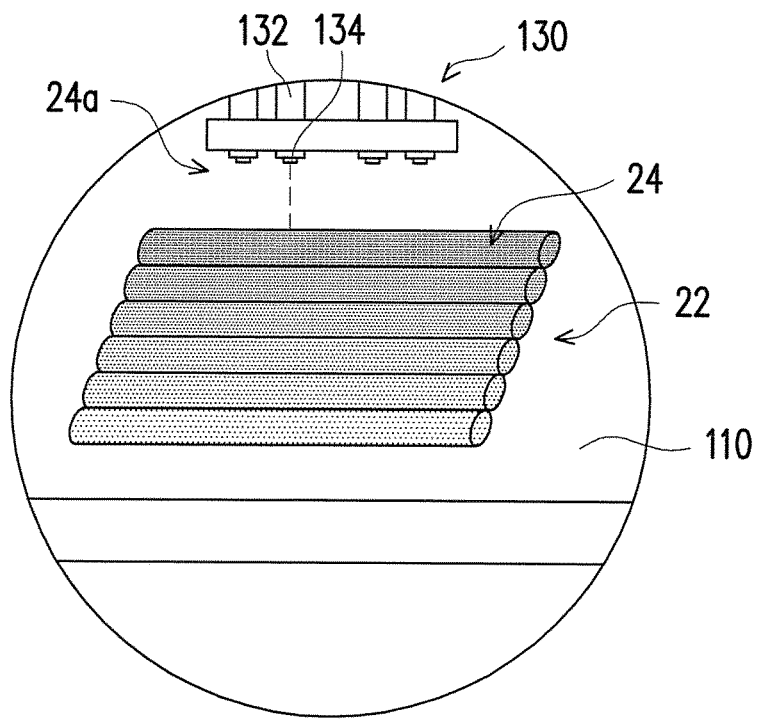

Next, referring to FIG. 1 and FIG. 3, in this embodiment, the direct dyeing type color fused deposition modeling three-dimensional printing method further includes a step of forming the color-ink layer 24 on the forming-material layer 22. Specifically, the direct dyeing type color fused deposition modeling three-dimensional printing apparatus 100 forms the color-ink layer 24 on the forming-material layer 22 by the color-inkjet unit 130. The step of forming the color-ink layer 24 on the forming-material layer 22 means to dye the forming-material layer 22. Therefore, the color-inkjet unit 130 may include multiple supply cartridges 132 and multiple inkjet heads 134, wherein the supply cartridges 132 are configured to store multiple color inks 24a respectively and communicate with the corresponding inkjet heads 134, and the inkjet heads 134 provide the corresponding color inks 24a onto the forming-material layer 22 as required, so as to dye the forming-material layer 22 and thereby form the color-ink layer 24 on the forming-material layer 22. Further, each of the inkjet heads 134 would be a piezoelectric type inkjet head, a thermal bubble type inkjet head or other type of inkjet head. Nevertheless, it should be noted that the invention is not intended to limit the structure of the color-inkjet unit 130, which may be adjusted as required. The color-inkjet unit 130 is similar to a color-inkjet system used by a two-dimensional color printing apparatus, for example, the YMCK color-inkjet system (such as four color inks 24a correspondingly store in four supply cartridges 132 and provided through four inkjet heads 134 shown in FIG. 3), which mixes a plurality of color inks 24a according to a desired ratio and provides the mixture on the forming-material layer 22 to form the color-ink layer 24. In addition, different parts of the same color-ink layer 24 may have different colors, such that the color-ink layer 24 presents multiple colors.

Figure 4:
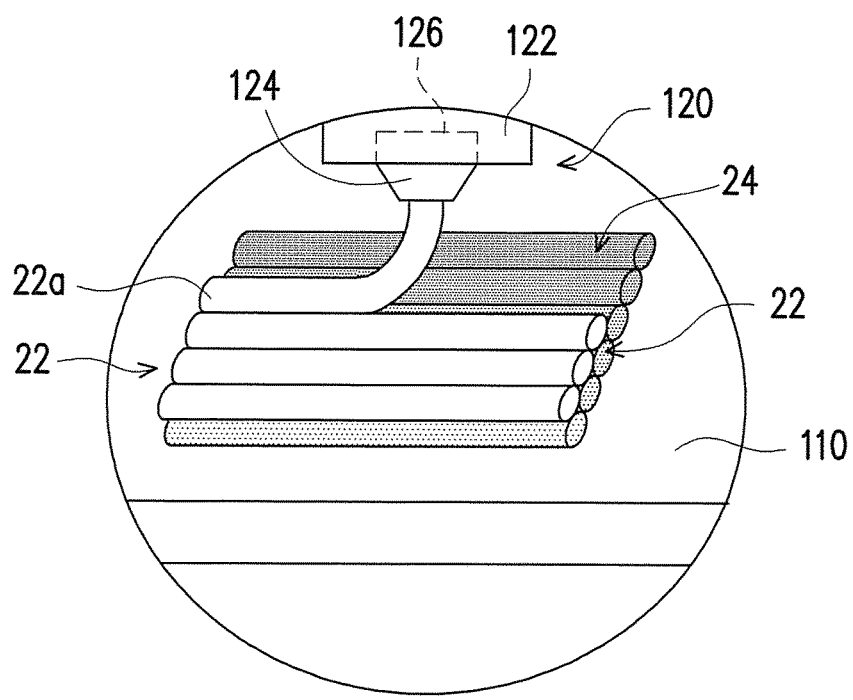

Similarly, referring to FIG. 1 and FIG. 4, in this embodiment, the direct dyeing type color fused deposition modeling three-dimensional printing method further includes a step of forming another forming-material layer 22 on the forming-material layer 22 on which the color-ink layer 24 has been disposed. Specifically, after forming and attaching the color-ink layer 24 to the corresponding forming-material layer 22, the direct dyeing type color fused deposition modeling three-dimensional printing apparatus 100 may form another forming-material layer 22 on the forming-material layer 22, on which the color-ink layer 24 has been disposed, by the forming unit 120. In other words, the forming unit 120 deposits the forming material 22a in the heated and melted state on the forming-material layer 22, on which the color-ink layer 24 has been disposed, so as to form another forming-material layer 22. The second forming-material layer 22 covers the first forming-material layer 22 and the first color-ink layer 24.

Figure 5:
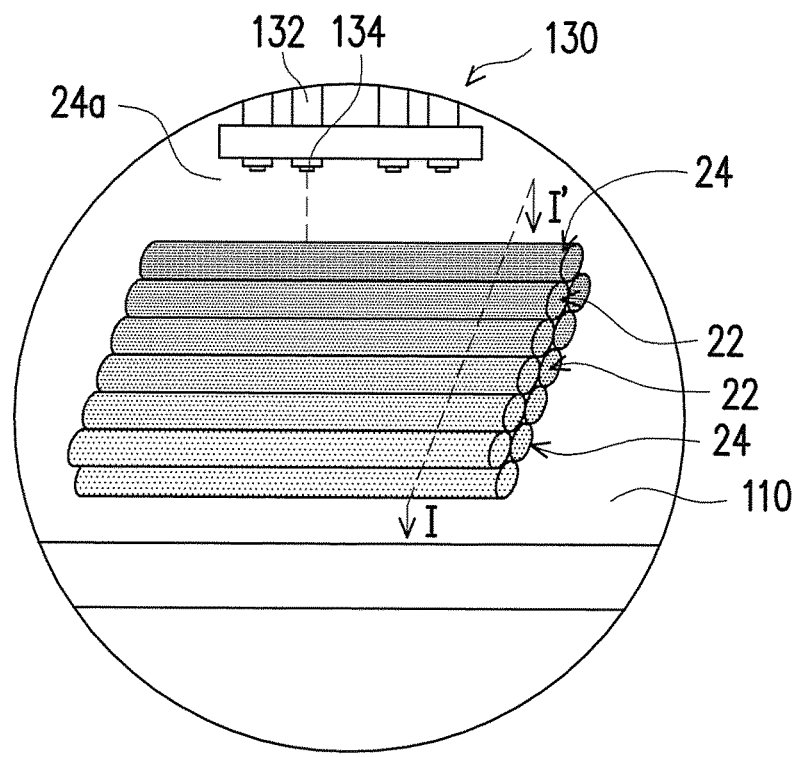

Similarly, referring to FIG. 1 and FIG. 5, in this embodiment, the direct dyeing type color fused deposition modeling three-dimensional printing method further includes a step of forming another color-ink layer 24 on the forming-material layer 22. Specifically, after forming another forming-material layer 22 on the first forming-material layer 22 and the color-ink layer 24, the direct dyeing type color fused deposition modeling three-dimensional printing apparatus 100 may form another color-ink layer 24 on the second forming-material layer 22 by the color-inkjet unit 130. In other words, the color-inkjet unit 130 provides the color ink 24a on the second forming-material layer 22 in the heated and melted state, so as to dye the second forming-material layer 22 and thereby form another corresponding color-ink layer 24. The second color-ink layer 24 covers the second forming-material layer 22.

Referring to FIG. 6 and FIG. 7, in this embodiment, the steps of FIG. 4 to FIG. 5 are repeated for the direct dyeing type color fused deposition modeling three-dimensional printing apparatus 100 to form multiple forming-material layers 22 and multiple color-ink layers 24 in sequence by the forming unit 120 and the color-inkjet unit 130, wherein the forming-material layers 22 and the color-ink layers 24 are stacked alternately in sequence to form the colored three-dimensional object 20 (as shown in FIG. 6) or the colored three-dimensional object 20a (as shown in FIG. 7). The aforementioned figures illustrate an example where the colored three-dimensional objects 20 and 20a respectively include two layers. However, it should be noted that the number of the layers and the color of each layer may be adjusted as required. Accordingly, with the direct dyeing type color fused deposition modeling three-dimensional printing apparatus 100 and the direct dyeing type color fused deposition modeling three-dimensional printing method of the embodiments, the structure of each layer of the colored three-dimensional objects 20 and 20a has a colored appearance.

Furthermore, in this embodiment, according to material properties of the forming material 22a, the color ink 24a may be absorbed by the forming material 22a, such that the color-ink layer 24 is adsorbed to the forming-material layer 22 and permeates into the forming-material layer 22 (as shown in FIG. 7), or the color ink 24a may not be easily absorbed by the forming material 22a, such that the color-ink layer 24 is coated on the surface of the forming-material layer 22 (as shown in FIG. 6).

To be more specific, in the embodiment of FIG. 7, a material of the forming material 22a of the forming-material layer 22 is preferably a dyeable material, such as a material with hydrophilic base material, a fibrous material, or any material that is suitable for adsorbing the color-ink layer 24. In this embodiment, the material with hydrophilic base, such as nylon, is used as an example. Thus, the color ink 24a may be absorbed by the forming material 22a that is the dyeable material, such that the color-ink layer 24 is adsorbed onto the forming-material layer 22 and permeates into the forming-material layer 22. On the other hand, the forming material 22a of the forming-material layer 22 may be a less absorptive material, such as a material without hydrophilic base initially, but generating hydrophilic base through a process of changing functional group to be dyeable. Specifically, the material without hydrophilic base initially, such as polylactide (PLA), is used as an example, and after the material without hydrophilic base generates hydrophilic base (such as —OH based) through a process of changing functional group (such as a plasma process), the forming-material layer 22 are dyeable, so that the color-ink layer 24 may still be coated on the forming-material layer 22 as shown in FIG. 7. Furthermore, in the embodiment of FIG. 6, the forming material 22a of the forming-material layer 22 may be a less absorptive material without additional treatment. Although the color ink 24a may not be easily absorbed by the forming material 22a due to the material properties, the color-ink layer 24 may still be coated on the surface of the forming-material layer 22 (as shown in FIG. 6). Accordingly, the material of the forming-material would be chosen as required, the invention is not limited to the above embodiments.

In addition, in order to securely attach the color-ink layer 24 to the forming-material layer 22, a material of the color-ink layer 24 may be a dye capable of physically attaching or chemically bonding with the forming-material layers, such as an acid dye that preferably has a pH value of 3-6 and has a chemical structure containing —OH group, —SO3H group, and —COOH group. When an acid dye having anionic is used as the color ink 24a, ionic bonding is generated due to the acidic properties, such that the color ink 24a dyes the forming-material layer 22 to form the color-ink layer 24. Nevertheless, the invention is not intended to limit the types of the materials of the forming-material layer 22 and the color-ink layer 24, which may be changed as required.

Moreover, in this embodiment, in order to securely attach the color-ink layer 24 to the forming-material layer 22, each color-ink layer 24 is preferably formed on the corresponding forming-material layer 22 when the corresponding forming-material layer 22 is in the heated and melted state. That is, in comparison with a case where the color-ink layer 24 is formed on the forming-material layer 22 that has cooled down and been cured, in this embodiment, the color-ink layer 24 is preferably formed while the forming-material layer 22 is still in the heated and melted state, so as to properly attach the color-ink layer 24 to the forming-material layer 22. A method of keeping the forming-material layer 22 in the heated and melted state may include using the aforementioned thermostat chamber 160 to maintain the forming-material layer 22 on the forming stage 110 in the heated and melted state, or using the forming stage 110 that has a heating function to keep the forming-material layer 22 in the heated and melted state. The heated and melted state refers to a state where the forming-material layer 22 remains melted in a predetermined time. The extent of melting of the forming-material layer 22 may be adjusted as required. For example, the constant temperature environment may be controlled to keep the forming-material layer 22 in a semi-melted state. Additionally, regarding the steps of forming the colored three-dimensional objects 20 and 20a in the constant temperature environment (controlled by the aforementioned thermostat chamber 160, for example), the heated and melted state of the forming-material layer 22 not only facilitates adsorption or coating the color-ink layer 24 on the forming-material layer 22, but also enhances the effect of attaching the color-ink layer 24 made of the acid dye to the forming-material layer 22. In other words, using the acid dye as the color ink 24a and performing dyeing in the predetermined constant temperature environment further enhance the effect of attaching the color-ink layer 24 to the forming-material layer 22. A temperature of the constant temperature environment created by the thermostat chamber 160 is in a range of 50° C. to 190° C. and is preferably 70° C., but the invention is not limited thereto. The temperature may be adjusted according to the types of the materials of the forming-material layer 22 and the color-ink layer 24.

Accordingly, in this embodiment, the direct dyeing type color fused deposition modeling three-dimensional printing apparatus 100 and the direct dyeing type color fused deposition modeling three-dimensional printing method are not only used for forming the colored three-dimensional objects 20 and 20a and may also perform/include the steps of using the dyeable material as the forming material 22a to form the forming-material layer 22, using the acid dye to form the color-ink layer 24, forming the color-ink layer 24 while the forming-material layer 22 is in the heated and melted state and/or forming the colored three-dimensional objects 20 and 20a in the constant temperature environment, so as to improve adsorption of the color-ink layer 24 to the forming-material layer 22, such that the colored three-dimensional objects 20 and 20a present favorable color properties.

Figure 8:
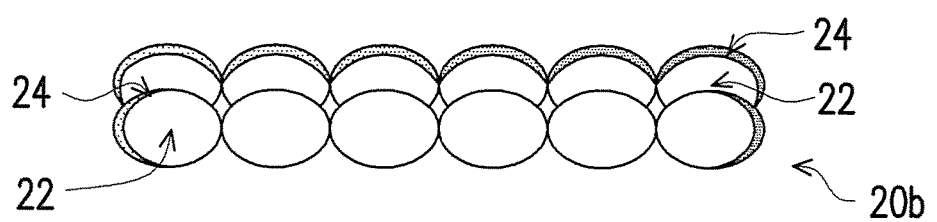
FIG. 8 is a schematic cross-sectional view of the colored three-dimensional object according to another embodiment of the invention.

Moreover, in this embodiment, the color-inkjet unit 130 provides the color-ink layers 24 on the entire outer surfaces of the corresponding forming-material layers 22 in sequence, such as shown in FIG. 6-7. In other words, while each of the color-ink layers 24 is formed on the corresponding forming-material layer 22, the color-ink 24a is provided onto the entire outer surfaces of the corresponding forming-material layer 22, such as formed on the side and top surfaces of the forming-material layers 22 as shown in FIGS. 3 and 5. In this configuration, the colored three-dimensional objects 20 and 20a present favorable color properties. On the other hand, FIG. 8 is a schematic cross-sectional view of the colored three-dimensional object according to another embodiment of the invention. Compare to the FIG. 7-8, the color-inkjet unit 130 in the embodiment of FIG. 8 provides the color-ink layers 24 on portions of the corresponding forming-material layer 22 which are corresponding to outer surfaces of the colored three-dimensional object 20b in sequence. In other words, the color-ink layers 24 are only formed on the periphery regions of the corresponding forming-material layers 22, and the periphery regions are directed to the outer surfaces of the colored three-dimensional object 20b. For example, the first color-ink layers 24 is formed only on the side surfaces of the first forming-material layer 22, and the last (namely, the second one) color-ink layers 24 is formed on the side and top surfaces of the last (namely, the second one) forming-material layer 22, as shown in FIG. 8. In this configuration, the cost of the color-ink 24a can be reduced. Accordingly, the covering area of the color-ink layers on the corresponding forming-materials would be chosen as required, the invention is not limited to the above embodiments.

In conclusion, the direct dyeing type color fused deposition modeling three-dimensional printing apparatus and the direct dyeing type color fused deposition modeling three-dimensional printing method of the invention utilize the forming unit to form the forming-material layers on the forming stage by fused deposition modeling (FDM), then use the color-inkjet unit to directly dye the forming-material layers to form the color-ink layers, and repeat the steps to alternately stack the forming-material layers and the color-ink layers in sequence, so as to form the colored three-dimensional object. Thus, the structure of each layer of the colored three-dimensional object has a colored appearance and the overall color properties is enhanced. Moreover, different parts of each color-ink layer may have different colors to improve the color variability. Moreover, the step of forming the colored three-dimensional object, as described above, may further include using the dyeable material to form the forming-material layer, using the acid dye to form the color-ink layer, forming the color-ink layer while the forming-material layer is in the heated and melted state and/or forming the colored three-dimensional object in the constant temperature environment, so as to improve adsorption of the color-ink layer to the forming-material layer. Accordingly, the direct dyeing type color fused deposition modeling three-dimensional printing apparatus and the direct dyeing type color fused deposition modeling three-dimensional printing method of the invention improve the efficiency of manufacturing the colored three-dimensional object as well as enhance the color properties and variability of the colored three-dimensional object.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A direct dyeing color fused deposition modeling three-dimensional printing method, comprising:
    forming a forming-material layer on a forming stage;
    forming a color-ink layer on the forming-material layer;
    forming another forming-material layer on the forming-material layer on which the color-ink layer has been formed; and
    forming another color-ink layer on the forming-material layer, wherein the forming-material layers and the color-ink layers are stacked alternately in sequence to form a colored three-dimensional object, wherein a material of the forming-material layers comprises a material with hydrophilic base to be dyeable or a material without hydrophilic base initially but generating hydrophilic base through a process of changing functional group to be dyeable.

2. The direct dyeing color fused deposition modeling three-dimensional printing method according to claim 1, wherein each of the color-ink layers is formed on the corresponding forming-material layer while the corresponding forming-material layer is in a heated and melted state.

3. The direct dyeing color fused deposition modeling three-dimensional printing method according to claim 1, wherein a material of the color-ink layers comprises a dye capable of physically attaching or chemically bonding with the forming-material layers.

4. The direct dyeing color fused deposition modeling three-dimensional printing method according to claim 1, wherein the step of forming the colored three-dimensional object is performed in a constant temperature environment, and a temperature of the constant temperature environment is in a range of 50° C. to 190° C.

5. The direct dyeing color fused deposition modeling three-dimensional printing method according to claim 1, wherein a color-inkjet unit provides the color-ink layers on the entire outer surfaces of the corresponding forming-material layers in sequence.

6. The direct dyeing color fused deposition modeling three-dimensional printing method according to claim 1, wherein a color-inkjet unit provides the color-ink layers on portions of the corresponding forming-material layer which are corresponding to outer surfaces of the colored three-dimensional object in sequence.

\* \* \* \* \*